Oct. 13, 1970  B. S. BAKER ET AL  3,533,852
FUEL CELL MATRIX AND METHOD OF IMPREGNATING PERIPHERY OF
MATRIX WITH CHLOROTRIFLUORO-ETHYLENE POLYMER
Filed Dec. 28, 1966
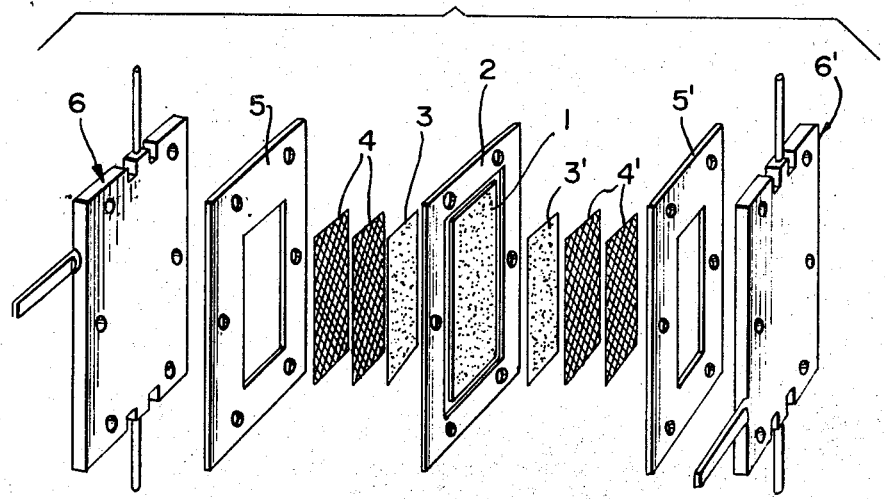
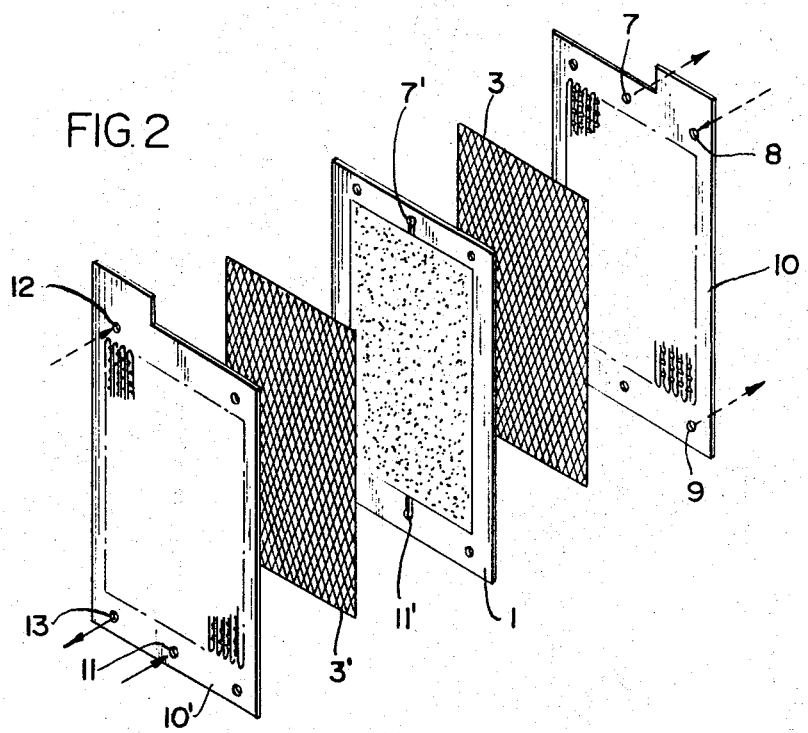
INVENTORS
BERNARD S. BAKER
DANIEL Y. C. NG
BY *Bair, Freeman & Molinare*
ATTORNEYS.

3,533,852
FUEL CELL MATRIX AND METHOD OF IMPREGNATING PERIPHERY OF MATRIX WITH CHLOROTRIFLUORO-ETHYLENE POLYMER

Bernard S. Baker and Daniel Y. C. Ng, Chicago, Ill., assignors, by mesne assignments, of one-half to Consolidated Natural Gas Service Company, Inc., Pittsburgh, Pa., a corporation of Delaware, and one-half to Southern California Gas Company and Southern Counties Gas Company of California, both of Los Angeles, Calif., and both corporations of California
Filed Dec. 28, 1966, Ser. No. 605,413
Int. Cl. H01m 3/00, 27/00, 13/00
U.S. Cl. 136—145                             5 Claims

ABSTRACT OF THE DISCLOSURE

Fiberglass or asbestos matrix elements for liquid electrolyte fuel cells are edge-impregnated with solutions of CTFE or copolymers of CTFE with $VF_2$ dissolved in a suitable solvent, such as MEK. The method of impregnating includes dipping and drying of the matrix several times and increased concentrations of the solution may be used in the second or subsequent immersions. It is disclosed that the impregnated edge must be compressible, but less so than the non-impregnated portions of the matrix. The preferred impregnant is Kel-F, and the resultant matrix shows improved leak resistance and batteries containing the matrix elements show improved operation.

BACKGROUND

Field

The field of this invention relates to the reinforcement and sealing of matrix elements that serve in liquid electrolyte fuel cells.

The problem and prior art

Second generation fuel cells of the immobilized electrolyte matrix type consist of two thin sheets of electrodes contacting either side of a pseudosolid that holds or retains absorbed electrolyte. Such fuel cells have well recognized advantages of compactness, simplicity of construction and the convenience of low temperature operation. Prior art matrix element materials for use in holding electrolyte have included asbestos matrices for alkaline systems and treated asbestos, glass fiber, or Teflon (polytetrafluoroethylene) matrices for acid electrolytes.

In order to prevent the loss of electrolyte and leakage of the input fuel, the edges of prior art asbestos matrices have been impregnated with a wax compound, such as "high temperature Ross wax," used in "Engineering Research Study of Fuel Cell Power Pack, Phase II Report" of work for the Harry Diamond Laboratories, Ordinance Corps, on Contract No. DA–49–186–502–ORD–1057 (Feb. 28, 1963). A typical Ross wax is "Ross Wax 160," a synthetic high melting point wax of tan color, having the following analysis and solubilities:

Melting point _____ 314–318° F.(157–159° C.).
Flash point _____ Minimum 590° (310° C.).
Acid number _____ 5–10.
Iodine number _____ 7.5.
Specific gravity _____ 1.0232
Penetration – ASTM–D5–61
  at 100 grams _____ 3.5.
Dielectric constant (1000
  cycles) _____ 3.0.
Power factor _____ 0.00977

Solubility in hot solvents:
  Naphtha _____ Isopropanol.
  Xylene _____ Trichloroethylene.
  Carbitol.

Insoluble in solvents at ordinary temperatures or in water. Compatible with:

Hydrocarbon waxes _____ Hydrogenated castor oil.
Ester type waxes _____ Fats.
Vegetable waxes _____ Rosin.

However, difficulties were encountered in maintaining an edge surface of uniform thickness and density. Even more serious is the fact that such a wax compound is chemically too unstable under fuel cell conditions for satisfactory operation and has a maximum usable temperature limitation of between 320° F. to 350° F.

Further, it has been reported in the "Phase II Report" supra, that in a fuel cell module using a Ross wax impregnated into the asbestos electrolyte matrix, the coefficient of expansion of the wax is such that when the temperature of the module was reduced to 34° F. the wax seal was broken and gas escaped from the cell module. Also, the wax had a high enough vapor pressure that it had a tendency to vaporize and pass out of the module with the recirculated hydrogen fuel gas. The was then would collect in the valves and restrict the flow of gas. Excess wax on the electrolyte matrix prior to assembly had a tendency to melt and flow into the gas passages during the construction of the fuel cell module.

Other prior art matrices have been heat sealed with polyethylene and polypropylene film, but the inherent temperature limitation of such films (approximately 200° F. and 250° F. respectively) is too low to lead to satisfactory edge seal during operation of the cell in the upper end of the operating temperature range. Further, the imperfect matrices of such type of construction additionally necessitated the use of peripheral gasketing around the matrix whether or not the peripheral edges of the matrix was sealed with wax or the above-noted plastics. As well as lacking adequate mechanical strength, such matrices are unable to form good seals with such gaskets.

OBJECTS AND SUMMARY

It is among the objects of this invention to provide a matrix element that is chemically stable in the electrolyte, has low resistance to ionic transport, is highly absorbent, and compact and leak resistant.

It is a further object to provide a matrix element that has adequate mechanical strength and an ability to form a good seal with surface electrode gaskets, but not itself require additional peripheral edge gasketing around the matrix to prevent leakage of the electrolyte or fuel.

Additionally, it is an object to provide a simplified and convenient procedure for forming such matrices that can be made from commercially available materials, and is useful for both acid and alkaline electrolytes.

By this invention such a matrix element is provided by impregnating an area around the edges of a fiberglass or asbestos matrix with a poly (chlorotrifluoroethylene) plastic (CTFE), or copolymers thereof with vinylidene fluoride ($VF_2$), such as Kel-F. The plastic reinforced edge area acts as a retainer for the liquid electrolyte, a sealing gasket to prevent gas leakage on the edges of the fuel cell assembly, and a structural member adding strength to the matrix thus reducing chances of damage thereto. The semi-rigidness of the impregnated matrix results in easily formed smooth and flat sealing surfaces and the conventional peripheral matrix gaskets may be entirely eliminated.

DRAWINGS

FIG. 1 illustrates a prior art fuel cell; and

FIG. 2 illustrates the Kel-F edge-impregnated matrix of the present invention in its relation to the rest of the fuel cell elements with parts corresponding to those of FIG. 1 being numbered the same.

The KF–800 and 827 polymers are copolymers of chlorotrifluoroethylene (CTFE) and vinylidene fluoride ($VF_2$), which are obtained in the form of free flowing white powders, soluble in conventional solvents. They are resistant to acids and most bases and have extremely low permeability to moisture. The KF–827 has a considerably higher molecular weight than the KF–800, as well as a higher modulus and softening temperature, KF–827 is less soluble than the KF–800. Typical properties are:

|  | KF–800 | KF–827 |
|---|---|---|
| Specific gravity | 2.02 | 2.02. |
| Color-molded sheet | Clear, transparent | Clear, transparent. |
| Tensile, p.s.i. | 1,500 | 3,400. |
| Elongation, percent | 350 | 230. |
| Modulus 100%, p.s.i. | 400 | N.A. |
| Shore D, hardness | 64 | 64. |
| Solution viscosity, CS [1] | 0.5 | 1.5. |
| Solubility in: |  |  |
| MEK | Yes at 20° C. | Limited 25° C., but good at higher temps. |
| MIBK | do | Do. |
| Ethyl acetate | do | Do. |
| Butyl acetate | do | Do. |
| Acetone | do | Do. |
| Toluene | No | No. |
| Iso-propanol | No | No. |
| THF | Yes at 25° C. | Yes. |
| Water adsorption | <0.01 | <0.01. |
| Molding temp. ° F. | 300 | 400. |
| Flammability | Non-burning | Non-burning. |
| Impact strength, Izod, notched | 77° F., No break | No break. |

[1] 0.75% in 2,5-dichlorobenzotrifluoride at 130° C.

Referring now to FIG. 1, a matrix 1, which holds the electrolyte, is surrounded by a peripheral gasket and spacer element 2. Electrodes 3, 3', of somewhat smaller size than the matrix 1, are placed on either side of the matrix. In turn, pairs of spacer screens 4, 4' are sandwiched between end plates 6, 6' and the electrodes 3, 3' and function to provide spaces for the circulation of fuel gases. Peripheral gaskets 5, 5' surround the spacer screens and electrodes, and must provide a good seal with matrix spacer gasket 2 and the end plates 6, 6'. Additionally, but not shown in FIG. 1, these cells have heating elements on the end plates 6, 6', input and outlet tubes for the fuel gases, and bolts that pass through the holes in the periphery of the gaskets and end plates, for tightly compressing the cell into a single unit. By such compression a seal, to prevent electrolyte and gas leakage is sought to be effected.

Referring now to FIG. 2, cells embodying the present invention contain an electrolyte matrix element 1, which has its periphery impregnated with Kel-F plastic. The portion of the fiberglass matrix impregnated with Kel-F is shown as a smooth surface in FIG. 2, while the non-impregnated portion is stippled. Disposed on both sides of the matrix, and coextensive with the non-impregnated portion of the matrix, are electrodes 3, 3', a cathode and an anode respectively. Overlying each electrode are current collector and fuel gas distributor plates 10 and 10', not the subject of the present invention. An optional electrolyte inlet manifold is shown at 11, 11' and the optional electrolyte outlet manifold at 7, 7'; matrix type cells can be filled with electrolyte prior to assembly, thereby eliminating the need for manifolds 11 and 7. Similarly, the fuel gas input is via manifold 12 and outlet via manifold 7'. The air inlet manifold is indicated at 8 and the corresponding outlet at 13. A number of such matrix-electrode bi-polar collector plate units are ordinarily disposed serially adjacent each other to form an entire fuel cell battery. The entire fuel cell battery sandwich is tightly clamped together between end plates (not shown) to effect good contact and sealing between the adjacent surfaces.

The Kel-F matrix edge-impregnant is resistant to both concentrated acid and alkaline electrolyte and is suitable for the operating temperature range of from room temperature to 350° F. It has good sealing and mechanical properties. Suitable Kel-F polymers are the brands "KF-800" and "KF-827", although the KF-800 is preferred.

"KEL-F" 827 and "KEL-F" 800 brand polymers have excellent chemical resistance to dilute and con. $H_2SO_4$, dilute and con. HCl, red fuming nitric acid, 90% hydrogen peroxide, NaOH, hydrocarbon fuels, and inorganic salt solutions. Solutions may be prepared by dissolving 10–30% of the KF–800 resin in ketone or acetate solvents. The less soluble KF–827 may be used to thicken the solution if desired. KF–827 by itself has limited solubility in the lacquer-type solvents. It is quite soluble in the THF, however.

A saturated solution of the KF–800 powder in methyl ethyl ketone (MEK) is used. Solutions of various concentration can be obtained by changing the temperature of the solution. The process of impregnating the matrix edge consists of immersing the edges of the matrices in the Kel-F solution. Two or more successive immersions may be made. When a plurality of immersions are employed, a less concentrated (and therefore less viscous) solution is used for the first immersion solution in order to penetrate the pores of the matrix. The matrix is allowed to dry partially before subsequent dippings. The more viscous solution in a subsequent dipping forms an envelope around the edges. This serves to prevent leakage of liquid electrolyte. It also serves as a gasketing surface when the matrix is assembled between two conventional gaskets.

The dried plastic edge-impregnated "frame" of the matrix is semi-rigid. When the matrix is compressed between the flat surfaces of the gaskets it is formed into a smooth and effective sealing gasket. Further, since the edge of the matrix is now a smooth plastic it is readily machinable and well defined channels and holes for internal gas distribution can be located on the edges of matrix. This allows for more uniform gas distribution to be achieved without gas leakage. Since the impregnation does not involve high temperature and pressure steps, it has the advantage of reducing the chances of damage to the fragile matrix.

It has also been discovered that an important property of the matrix of this invention is the fact that the Kel-F impregnated edge will compress, but is less compressible than the electrolyte-containing central portion of the matrix.

In a matrix of the type discussed below in Example 1, the impregnated matrix was compressible under ordinary clamping pressures employed in securing cell units together in a battery assembly to 70% of its original thickness, while the non-impregnated central portion was compressed to 54% of its original thickness. This may be expressed as a compressibility ratio, impregnated to non-impregnated of 2 to 3. Thus, the differential compressibility as compared to the non-impregnated portion of the matrix permits sufficient resistance to form a good seal while yet being somewhat compressible to conform to the shape of the adjacent plates.

Further, the Kel-F impregnated edge will not take a permanent set nor deform under operating temperatures. Thus, the sealing compression of the cell may be uniform and there is no development of leakage of either fuel gas or electrolyte due to deformation. In contrast, a phenolic-resin peripheral impregnation is non-compressibly rigid and unsatisfactory in this regard.

The following are non-limiting examples illustrating the edge impregnated matrix element, the method of its production and its operation in a fuel cell.

EXAMPLE 1

Material

Martix: Whatman glass fiber paper GF–82, 0.025" nominal thick x 5½" x 9½".
Impregnant: Kel-F Brand KF–800 powder.
Solvent: Technical grade methyl ethyl ketone.

Procedure: A long, narrow (13" x 4" x 2" high) instrument tray was used to minimize the amount of solution required. Approximately 100 gm. of KF–800 powder was slowly added to 500 ml. of methyl ethyl ketone. The solution was heated to 60° C. on a hot plate while stirring constantly. When saturation was reached, the four sides of the matrix were successively immersed in the solution for periods of 60 seconds after first marking the depth of immersion. Because of the viscous nature of the solution, it will not spread appreciably by diffusion or osmotic effect. The matrix was allowed to dry for two hours.

The solution was heated to 100° C. and approximately 50 gm. of KF–800 powder was added to obtain a saturated solution. The edges of the matrix were dipped for a second time. It was allowed to dry overnight. The total amount of KF–800 impregnated was 7.2 gm.

EXAMPLE 2

A comparison between batteries using a non-impregnated matrix having peripheral gaskets of the type shown in FIG. 1 and batteries constructed with the edge-impregnated matrix of the present invention was made in this example.

In the prior art fuel cell, the electrolyte and gas leakage were observed visually. Several minutes after the battery started to operate, electrolyte could be seen seeping out along all four edges of the peripheral seals. The amount of leakage varied from battery to battery. Throughout a given run these edges would remain wet with electrolyte. Gas leakage was detected by applying soap solution along the edges of the battery. Bubbles were observed at leakage points.

In two batteries which were constructed with impregnated matrices, no electrolyte and gas leakages were detected. The edges of the battery were dry and application of soap solution gave no indication of gas leakage. The continuous operating time of the two runs were 118.65 hours and 53.85 hours respectively. In one run, an acid balance was performed. The acid electrolyte was all accounted for in the battery and in the outlet gas streams, i.e. there is no acid electrolyte leakage.

EXAMPLE 3

The relative compressibility of the impregnated and non-impregnated matrices was checked by a simple experiment. Two pieces of the respective material were compressed with an applied pressure of 150 p.s.i. In order to similate actual use conditions of the cell units in a battery, the non-impregnated matrix was soaked with 85% phosphoric acid. The percent reduction in thickness for the impregnated and non-impregnated matrices were to 70% and 54% respectively of the original thickness. The non-impregnated matrix is more compressible and therefore will not offer resistance to the formation of a good compression seal between the impregnated edge and the adjacent plates.

It will be understood by those skilled in the art that the embodiments disclosed herein are merely illustrative of the principles of the invention, and it will be obvious that changes may be made without departing from the spirit of the invention, and therefore the invention is to be limited only as indicated in the appended claims.

We claim:

1. A fuel cell electrolyte matrix comprising a porous matrix material selected from fiber-glass paper, asbestos, and treated asbestos, the outer periphery only of which is impregnated with a compressible plastic material the compressibility of which is less than that of the matrix material, said plastic material being selected from chlorotrifluoroethylene or a copolymer of chlorotrifluoroethylene with vinylidene fluoride.

2. A process of making a fuel cell electrolyte matrix element comprising immersing the edges of a porous matrix material in solutions of polychlorotrifluoroethylene or copolymers of chlorotrifluoroethylene with vinylidene fluoride to completely impregnate the periphery only of said matrix material, and drying said impregnated matrix material.

3. The process of claim 2 in which the matrix material is selected from the group consisting of fiber-glass paper, asbestos and treated asbestos.

4. The process of claim 3 in which the impregnation is achieved by a plurality of immersions.

5. A process of making a fuel cell electrolyte matrix element comprising immersing the edges of a porous matrix material selected from fiber-glass paper, asbestos, and treated asbestos in solutions of poly (chlorotrifluoroethylene) or copolymers of chlorotrifluoroethylene with vinylidene fluoride to impregnate the periphery only of said matrix material by a plurality of immersions, at least one of the immersions being into a saturated solution of a copolymer of chlorotrifluoroethylene and vinylidene fluoride in methyl ethyl ketone at a temperature of between 60 to 120° C., and drying said impregnated matrix material.

References Cited

UNITED STATES PATENTS

| 2,729,694 | 1/1956 | Ellis | 136—145 |
| 2,890,261 | 7/1955 | André | 136—145 |
| 3,306,779 | 7/1965 | Flannery | 136—86 |
| 3,311,507 | 3/1967 | Dittmann | 136—86 |
| 3,342,642 | 9/1967 | Barber | 136—86 |
| 3,379,573 | 4/1968 | Gershberg | 136—153 |

FOREIGN PATENTS 953,608   3/1954   Great Britain.

ALLEN B. CURTIS, Primary Examiner

P. D. ROSENBERG, Assistant Examiner

U.S. Cl. X.R.

136—86, 120; 117—126; 136—148